United States Patent
Miyamoto et al.

(10) Patent No.: US 9,096,272 B2
(45) Date of Patent: Aug. 4, 2015

(54) FRONT VEHICLE-BODY STRUCTURE OF VEHICLE

(71) Applicant: MAZDA MOTOR CORPORATION, Aki-gun, Hiroshima (JP)

(72) Inventors: Kouji Miyamoto, Aki-gun (JP); Noriyoshi Sahasi, Hiroshima (JP); Yasuhiko Nishida, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 14/133,273

(22) Filed: Dec. 18, 2013

(65) Prior Publication Data
US 2014/0175835 A1     Jun. 26, 2014

(30) Foreign Application Priority Data

Dec. 21, 2012  (JP) ................... 2012-279132
Dec. 21, 2012  (JP) ................... 2012-279133

(51) Int. Cl.
*B60J 1/02*     (2006.01)
*B62D 25/08*   (2006.01)
*B60R 21/34*   (2011.01)

(52) U.S. Cl.
CPC .............. *B62D 25/081* (2013.01); *B60R 21/34* (2013.01); *B60R 2021/343* (2013.01)

(58) Field of Classification Search
CPC   B60R 2021/343; B60R 21/34; B62D 25/081; B60J 1/02
USPC ........... 296/72, 70, 187.03, 187.09, 192, 208, 296/187.04, 193.02; 248/27.1; 180/90
See application file for complete search history.

(56) References Cited

U.S. PATENT DOCUMENTS

| | | | | |
|---|---|---|---|---|
| 6,193,305 | B1 * | 2/2001 | Takahashi | 296/192 |
| 6,869,134 | B2 * | 3/2005 | Kato et al. | 296/192 |
| 7,540,557 | B2 * | 6/2009 | Shimura | 296/192 |
| 7,552,964 | B2 | 6/2009 | Saito | |
| 8,136,870 | B2 * | 3/2012 | Ott et al. | 296/192 |
| 8,602,479 | B2 * | 12/2013 | Kuwabara et al. | 296/72 |
| 2011/0068607 | A1 * | 3/2011 | Ott et al. | 296/192 |

FOREIGN PATENT DOCUMENTS

JP     2009-126480 A     6/2009
JP     2009-179249 A     8/2009

OTHER PUBLICATIONS

The English language translation of an Office Action issued by the German Patent Office on Jun. 27, 2014; which corresponds to German Patent Application No. 10 2013 018 068.6 and is related to U.S. Appl. No. 14/133,273.

* cited by examiner

*Primary Examiner* — Glenn Dayoan
*Assistant Examiner* — Sunsurraye Westbrook
(74) *Attorney, Agent, or Firm* — Studebaker & Brackett PC (57) ABSTRACT

A cowl panel comprises an upper face portion, a protrusion portion, a vertical wall portion, and a lower face portion. A front end of the protrusion portion is configured in a curve shape in a plan view such that a central portion, in the vehicle width direction, of the front end is positioned forward the most. A lower end of the vertical wall portion is configured such that at least a central portion, in the vehicle width direction, of the lower end extends substantially straightly in the vehicle width direction. Accordingly, the flexibility of interior design can be improved, and also both the NVH performance and the pedestrian protection performance can be ensured.

13 Claims, 10 Drawing Sheets

FRONT VEHICLE-BODY STRUCTURE OF VEHICLE

BACKGROUND OF THE INVENTION

The present invention relates to a front vehicle-body structure of a vehicle equipped with a cowl panel which extends in a vehicle width direction and supports a windshield from below.

Conventionally, a so-called open cowl structure in which an open cross section which opens vehicle forward is formed by a cowl panel and a panel member, such as a dash upper panel supporting a rear end of the cowl panel, is known as a means for ensuring the pedestrian protection performance and the performance of restraining booming noise caused by vibration of a windshield (i.e., the so-called NVH (Noise Vibration Harshness) performance).

In a case in which the above-described open cowl structure is adopted, a support portion for supporting the rear end of the cowl panel at the panel member is necessarily configured to project vehicle rearward toward a vehicle compartment. Accordingly, there is a problem in that a space behind the cowl panel may not be ensured sufficiently, so that the flexibility of interior design of a front portion of the vehicle compartment may be improperly limited.

In recent years, need to utilize the space at the front portion of the vehicle compartment as a space for installing auxiliary devices/components of a vehicle has increased due to diversification of auxiliary devices/components installed to the vehicle or the like. Thus, the above-described flexibility of interior design has become an important matter as well as the above-described pedestrian protection and NVH performances.

Meanwhile, a structure equipped with a cowl panel which comprises a shelf portion (an upper face portion) which supports a windshield, a vertical wall portion and a vehicle-rearward side portion extending downward from the shelf portion, and a bottom portion (a lower face portion) which extends forward from the vehicle-rearward side portion, and a plate-shaped NV brace as a reinforcing member is known as an example in which the above-described open cowl structure is not adopted (see Japanese Patent Laid-Open Publication No. 2009-126480).

In the above-described patent document, the support rigidity of the windshield is ensued by forming a closed cross section with the vertical wall portion, the vehicle-rearward side portion of the cowl panel and the NV brace. Further, in a case in which a collision load is inputted from above when an object collides with the windshield or the like, the cowl panel and the NV brace deform in a bending shape, so that the collision energy is absorbed, thereby the pedestrian protection performance is ensured.

In the above-described patent document, however, while the cowl panel deforms at a lower end of the vertical wall portion and a bending portion of the bottom portion when the collision load is inputted to the windshield from above, an upper portion of the cowl panel which is comprised of the shelf portion and the vertical wall portion deforms very little, thereby does not perform the function of absorbing the collision energy properly. Therefore, the amount of energy absorption may not be necessarily sufficient as a whole of the cowl panel, so there is a room to make improvements in the pedestrian protection performance.

SUMMARY OF THE INVENTION

An object of the present invention is to provide a front vehicle-body structure of a vehicle which can ensure both the NVH performance and the pedestrian protection performance, improving the flexibility of interior design.

According to the present invention, there is provided a front vehicle-body structure of a vehicle equipped with a cowl panel which extends in a vehicle width direction and supports a windshield from below, wherein the cowl panel comprises an upper face portion, to which the windshield is joined, a protrusion portion being configured to extend downward from the upper face portion and protrude vehicle forward beyond a joint portion of the windshield and the upper face portion so as to deform in a folding state when receiving a load inputted from above, the protrusion portion having a front end which is configured in a curve shape in a plan view such that a central portion, in the vehicle width direction, of the front end is positioned forward the most, a vertical wall portion being configured to extend downward from the protrusion portion, the vertical wall portion having a lower end which is configured such that at least a central portion, in the vehicle width direction, of the lower end extends substantially straightly in the vehicle width direction, and a lower face portion being configured to extend vehicle forward from a lower end of the vertical wall portion.

The front vehicle-body structure according to the present invention can ensure both the NVH performance and the pedestrian protection performance, improving the flexibility of interior design.

Specifically, a space behind the cowl panel can be properly enlarged by the protrusion portion being configured to protrude vehicle forward beyond the joint portion of the windshield and the upper face portion. Accordingly, the flexibility of interior design can be improved. Further, since the front end of the protrusion portion is configured in the curve shape in the plan view such that the central portion, in the vehicle width direction, thereof is positioned forward the most, the support rigidity of the windshield can be increased more than a case in which the front end of the protrusion portion is configured to extend substantially straightly in the vehicle width direction in the plan view. Accordingly, the NVH performance can be ensured properly. Further, in a case in which a collision load is inputted from above when an object collides with the windshield or the like, the cowl panel can be made to deform in upper-and-lower two stages such that the protrusion portion folds up and the vertical wall portion falls down vehicle rearward. Accordingly, the collision energy can be absorbed by an entire part of the cowl panel properly. Herein, in a case in which the lower end of the vertical wall portion is configured in a curve shape such that a central portion, in the vehicle width direction, of the lower end is positioned forward the most, corresponding to the shape of the front end of the protrusion portion, there is a concern that it may be difficult to make the vertical wall portion fall down smoothly. According to the present invention, however, since the lower end of the vertical wall portion is configured such that at least the central portion, in the vehicle width direction, of the lower end extends substantially straightly in the vehicle width direction, the vertical wall portion can be made to fall down smoothly. Accordingly, the collision-energy absorption by the entire part of the cowl panel can be promoted, so that the pedestrian protection performance can be ensured properly.

According to an embodiment of the present invention, the front vehicle-body structure of a vehicle further comprises a dash panel being configured to extend in the vehicle width direction and be joined to the lower face portion of the cowl panel for supporting the cowl panel from below, wherein a joint portion of the dash panel and the lower face portion of the cowl panel is positioned in front of and apart from the central portion extending substantially straightly in the vehicle width direction of the lower end of the vertical wall portion. Thereby, it can be properly prevented that deforming of the lower end of the vertical wall portion, i.e., falling down of the vertical wall, is blocked by the joint portion of the dash panel and the lower face portion.

According to another embodiment of the present invention, the lower face portion of the cowl panel is configured to extend substantially horizontally, and an angle between the lower face portion and the vertical wall portion of the cowl panel is set at 90 degrees or larger. Thereby, the vertical wall portion can be made to fall down vehicle rearward more smoothly. Further, in a case in which the lower face portion is joined to the dash panel, if the above-described angle is set to be less than 90 degrees, the vertical wall portion slants forward and upward. Consequently, there is a concern that a working space for conducting welding with a welding gun set at the position of the joint portion of the both may not be ensured sufficiently. By contrast, since the angle is set at 90 degrees or larger according to the present embodiment, the above-described working space can be ensured sufficiently. Accordingly, the welding process can be facilitated.

According to another embodiment of the present invention, the angle between the lower face portion and the vertical wall portion is set substantially at 90 degrees. Thereby, in a case in which the position of the front end of the protrusion portion is set at a specified position, the depth (pressing amount) of the protrusion portion can be made smaller compared with a case in which the above-described angle is set to be larger than 90 degrees. Accordingly, an entire length of a plate member which is necessary for forming the cowl panel can be properly short, so that manufacturing costs can be reduced. Further, since the pressing amount at the time of forming the protrusion portion has a certain limit, the forming (processing) of the cowl panel can be facilitated by minimizing the depth of the protrusion (pressing amount) with setting the angle substantially at 90 degrees as well.

According to another embodiment of the present invention, a reinforcing member is joined to a vehicle-rearward side of the cowl panel in a vehicle-width-direction range of the central portion extending substantially straightly in the vehicle width direction of the lower end of the vertical wall portion, an upper portion of the reinforcing member being joined to a lower side of the upper face portion of the cowl panel, a lower portion of the reinforcing member being joined to a rear side of the vertical wall portion of the cowl panel, the reinforcing member having a bending portion which is configured to project vehicle rearward. Thereby, the reinforcing member can be made to directly contribute to the support rigidity of the windshield. Accordingly, the support rigidity of the windshield, thereby the NVH performance can be improved. Further, when the collision load is inputted to the windshield from above, the reinforcing member is made to deform in such a manner that the bending portion is displaced vehicle rearward. Accordingly, the support rigidity of the windshield can be improved more without improperly influencing the smooth deformation of the protrusion portion and the vertical wall portion.

According to another embodiment of the present invention, the reinforcing member has a first joint portion joined to the lower side of the upper face portion of the cowl panel at the upper portion thereof and a second joint portion joined to the rear side of the vertical wall portion of the cowl panel at the lower portion thereof, and the bending portion of the reinforcing member is provided between the first joint portion and the second joint portion, the first joint portion being joined to the upper face portion in the vicinity of the joint portion of the windshield and the upper face portion, the bending portion being formed at a central portion, in a vertical direction, of the reinforcing member which is positioned between the joint portion of the windshield and the upper face portion and an upper end of the second joint portion, or at a portion which is located below the level of the central portion of the reinforcing member. Thereby, since the bending portion of the reinforcing member is formed at the central portion or at the portion located below the level of the central portion, the portion from the lower end to the bending portion which is supported at the vertical wall portion by the joint to the second joint portion can be made properly short. In this case, since the deforming of a portion positioned above the bending portion and the vehicle-rearward displacement of the bending portion is made smoother so that the reinforcing member can be made to fold and deform (bend) greatly, the support rigidity of the windshield can be improved without improperly influencing the smooth deformation of the protrusion portion and the vertical wall portion. Thus, the pedestrian protection and the NVH performance can be ensured properly by the smooth deformation of the protrusion portion and the vertical wall portion.

According to another embodiment of the present invention, an angle between the windshield and the upper portion of the reinforcing member in a side view is set substantially at 90 degrees. Thereby, the windshield is supported substantially vertically, so that the support rigidity of the windshield, thereby the NVH performance can be improved further.

According to another embodiment of the present invention, the reinforcing member has a pair of rising edge portions at both ends, in the vehicle width direction, thereof, the pair of rising edge portions being configured to obliquely project vehicle rearward such that a distance, in the vehicle width direction, therebetween gradually increase toward vehicle rearward. Thereby, the rigidity of the reinforcing member against the vertical load can be increased. Accordingly, the support rigidity of the windshield, thereby the NVH performance can be improved further.

According to another embodiment of the present invention, the first joint portion of the reinforcing member has a flange portion which projects outward, in the vehicle width direction, from another part of the upper portion of the reinforcing member, and the reinforcing member is joined to the lower side of the upper face portion via said flange portion. Thereby, since the first joint portion of the reinforcing member has the flange portion projecting outward, in the vehicle width direction, from another part of the upper portion, the support rigidity of the windshield can be improved further by increasing a contact area of the first joint portion with the lower side of the lower face portion. Further, since the flange portion is joined to the lower side of the upper face portion, when welding process is conducted by using a welding gun which is set at a position of the joint portion of the first joint portion and the lower side of the lower face portion, it can be prevented that the above-described other part of the upper portion of the reinforcing member blocks the welding process, so that a large working space for conducting the welding can be ensured properly.

Other features, aspects, and advantages of the present invention will become apparent from the following description which refers to the accompanying drawings.

DETAILED DESCRIPTION OF THE INVENTION

Figure 1:
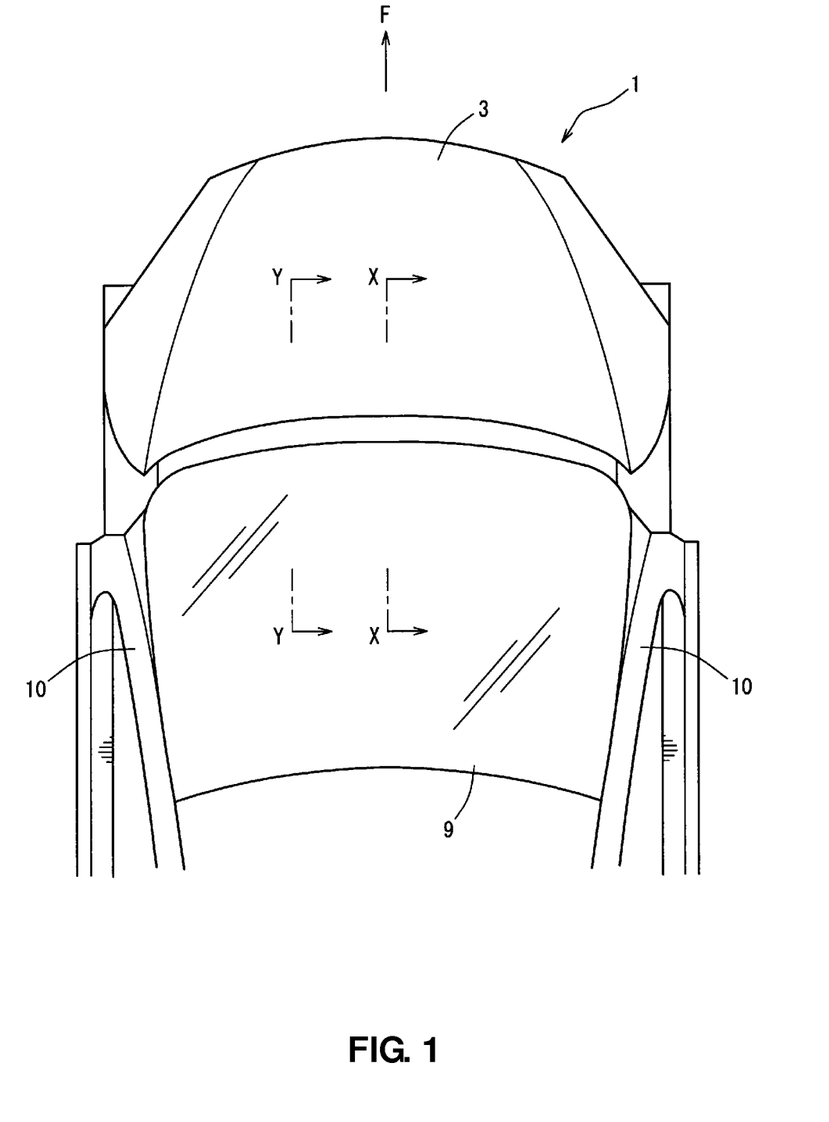
FIG. 1 is a plan view of a vehicle equipped with a front vehicle-body structure of a vehicle according to an embodiment of the present invention.
Figure 2:
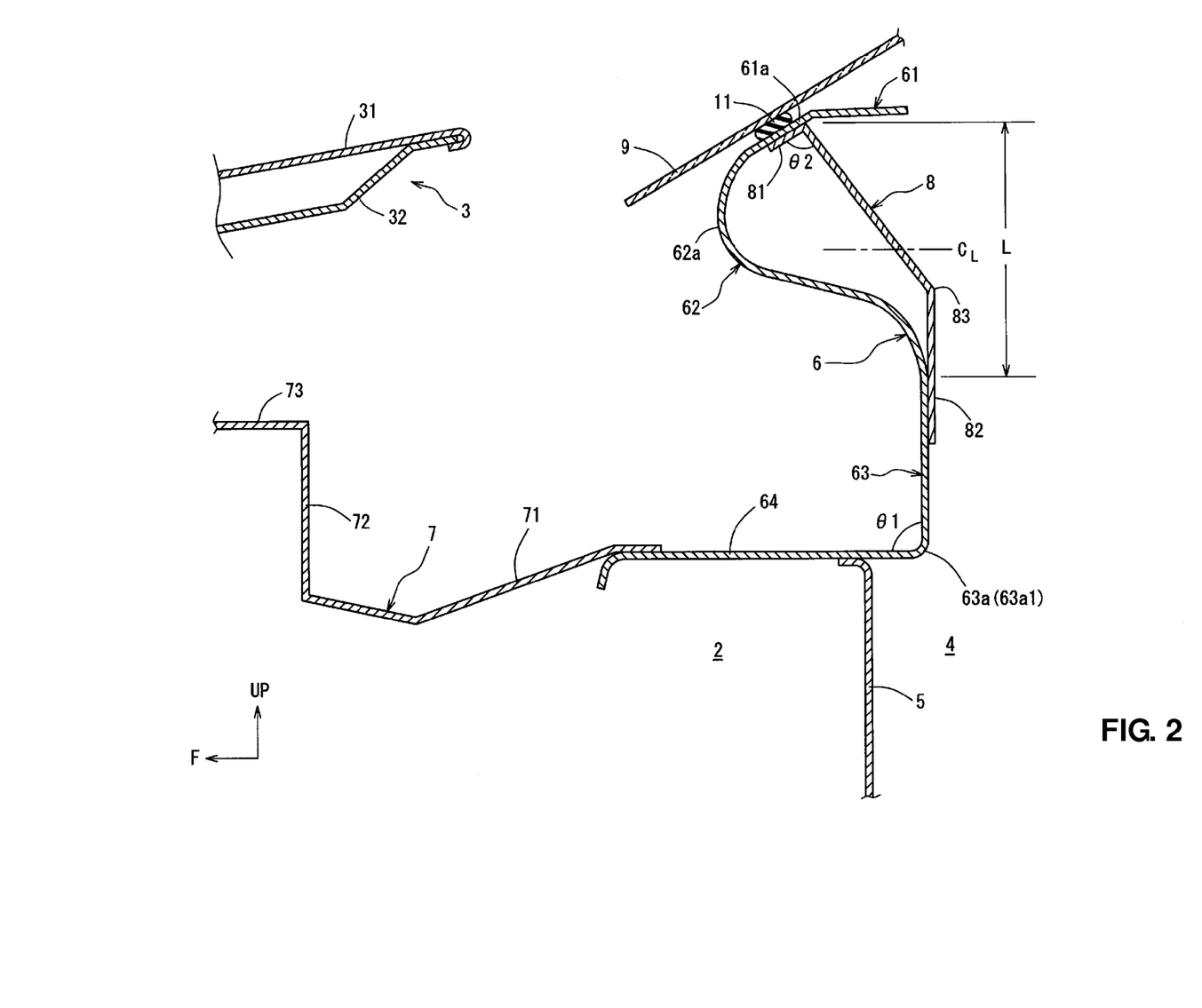
FIG. 2 is a sectional view taken along line X-X of FIG. 1.
Figure 3:
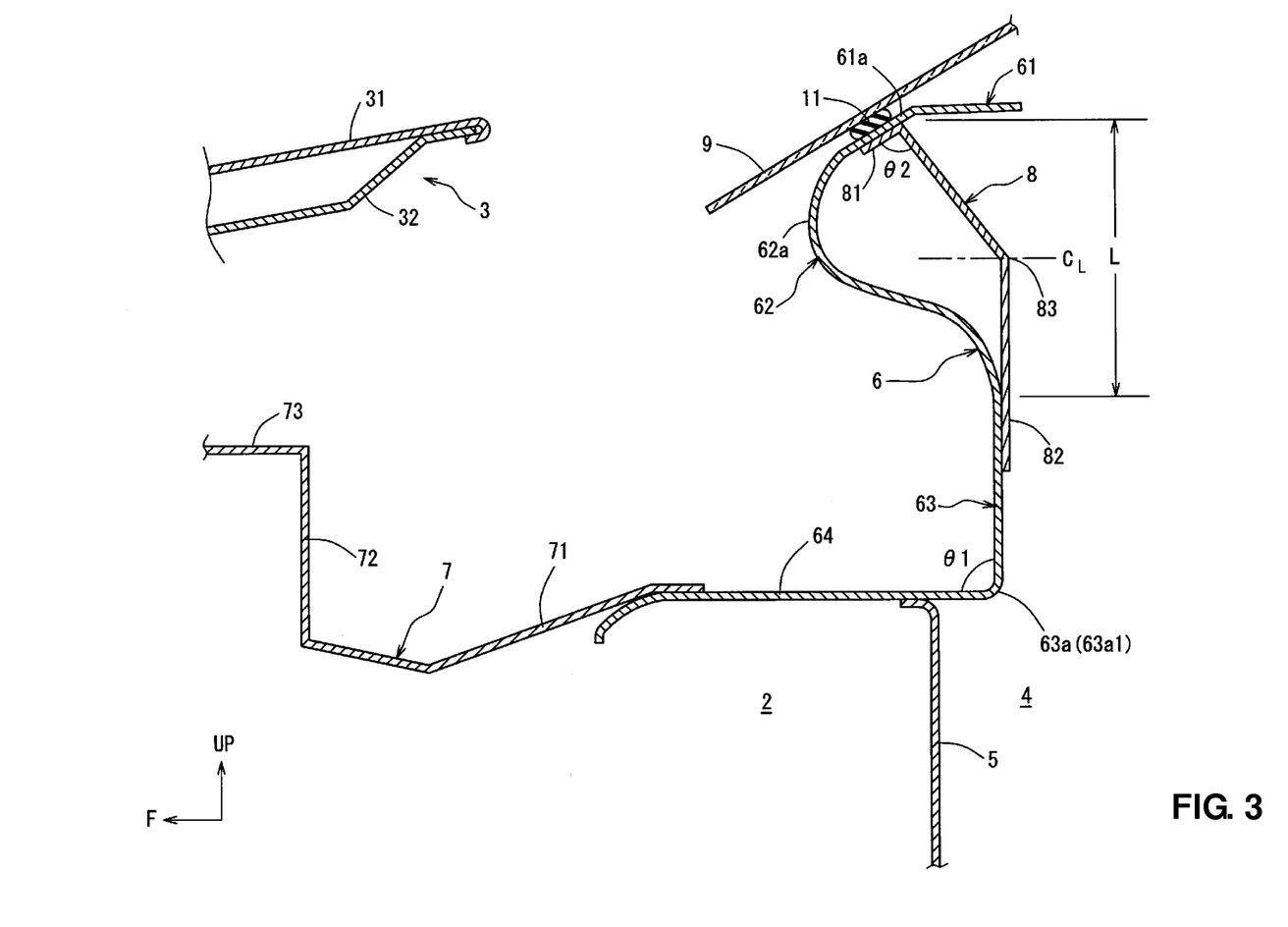
FIG. 3 is a sectional view taken along line Y-Y of FIG. 1.

Hereinafter, a preferred embodiment of the present invention will be described specifically referring to the accompanying drawings. A vehicle 1 according to the present embodiment comprises, as shown in FIGS. 1-3, a hood (bonnet) 3 covering an engine room 2, a dash panel 5 partitioning the engine room 2 from a vehicle compartment 4, a cowl panel 6 arranged above the dash panel 5, a cowl front panel 7 extending vehicle forward from a front end of the cowl panel 6, and plural reinforcing members 8 joined to the cowl panel 6. In the figures, an arrow F shows a vehicle-forward direction and an arrow UP shows a vehicle-upward direction.

As shown in FIGS. 2 and 3, the hood 3 is comprised of an outer panel 31 forming an outer surface and an inner panel 32 forming an inner face on the side of the engine room 2, which are joined together. Further, the hood 3 is connected to a vehicle body at respective rear ends of its both-side ends in a vehicle width direction via hinges, not illustrated. The hinges pivotally support the rear ends of the hood 3 so that the hood 3 can open or close.

The dash panel 5 extends in the vehicle width direction substantially over an entire width of the vehicle, so that it partitions the engine room 2 from the vehicle compartment 4 as described above, and also supports the cowl panel 6 from below.

The cowl panel 6 extends in the vehicle width direction and supports a lower end of a windshield 9 substantially over its entire width. Front pillars 10, 10 extending vehicle rearward and upward as shown in FIG. 1 are provided at both-side edge portions of the windshield 9, and respective lower end portions of the right-and-left front pillars 10, 10 are positioned above both-side end portions of the cowl panel 6.

The cowl panel 6 is comprised of, in a sectional view perpendicular to a longitudinal direction of the cowl panel 6 (in the vehicle width direction), an upper face portion 61, a protrusion portion 62 extending downward from the upper face portion 61 and protruding vehicle forward, a vertical wall portion 63 extending downward from the protrusion portion 62, and a lower face portion 64 extending vehicle forward from a lower end of the vertical wall portion 63, so that the cowl panel 6 is formed in substantially a S shape.

The upper face portion 61 of the cowl panel 6 has a slant face 61a which slants vehicle forward and downward so as to correspond to a slant of the windshield 9. This slant face 61a is joined to the lower end of the windshield 9 by an adhesive agent 11. Thus, the windshield 9 is supported at the upper face portion 61 of the cowl panel 6.

The protrusion portion 62 protrudes vehicle forward, forming substantially a C shape in the above-described sectional view. This protrusion portion 62 according to the present embodiment protrudes vehicle forward beyond a joint portion (the adhesive agent 11) of the windshield 9 and the upper face portion 61. Thus, the protrusion portion 62 is configured to deform in a folding state when a large load, such as a collision load, is inputted to the windshield 9 from above.

Figure 4:
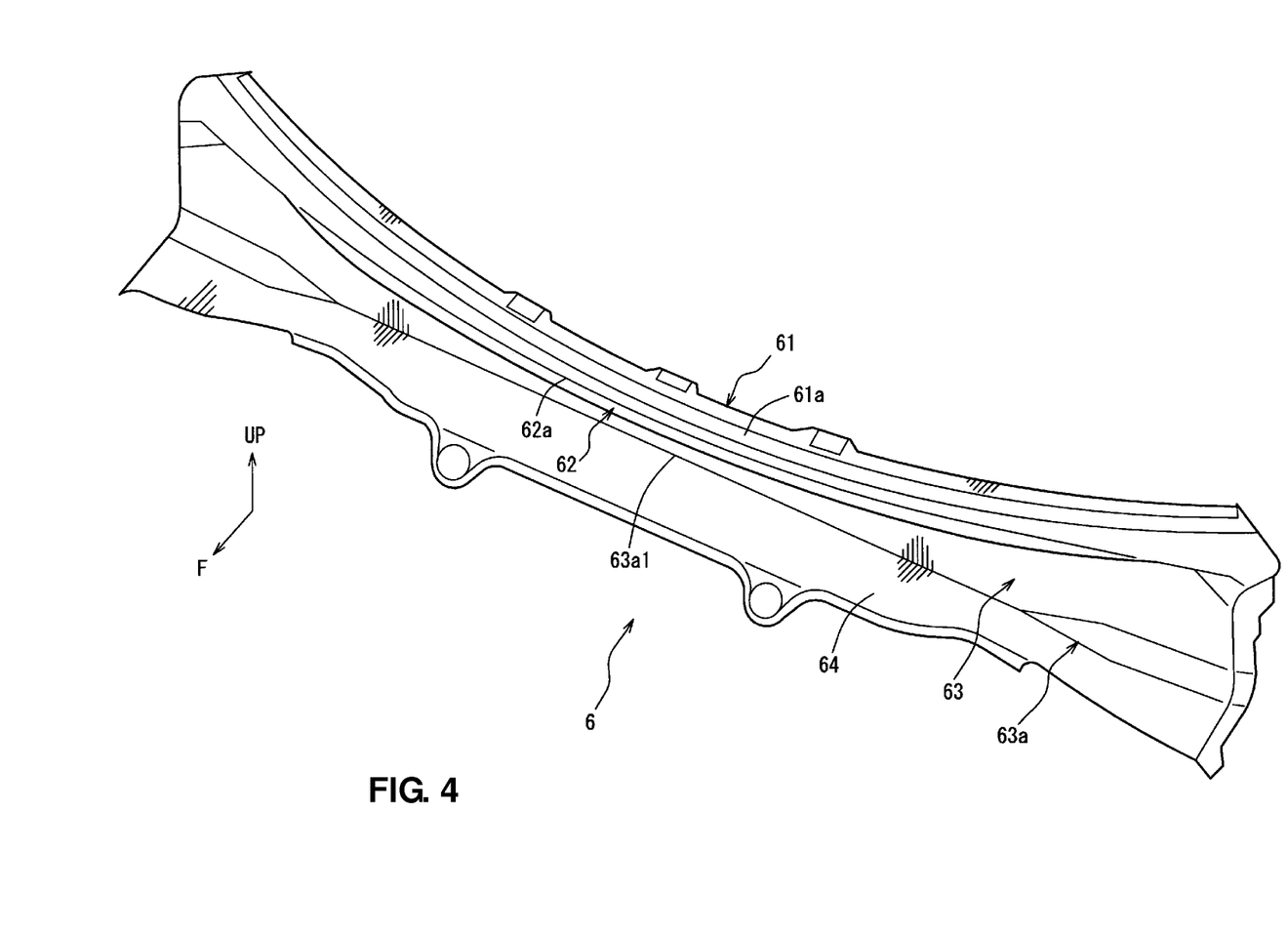
FIG. 4 is a perspective view of a cowl panel, when viewed from a vehicle front-and-upper side.

Further, a front end 62a of the protrusion portion 62 is configured in a curve shape in a plan view such that a central portion, in the vehicle width direction, of the front end 62a is positioned forward the most, corresponding to a shape of the lower end of the windshield 9 as shown in FIG. 4.

Figure 5:
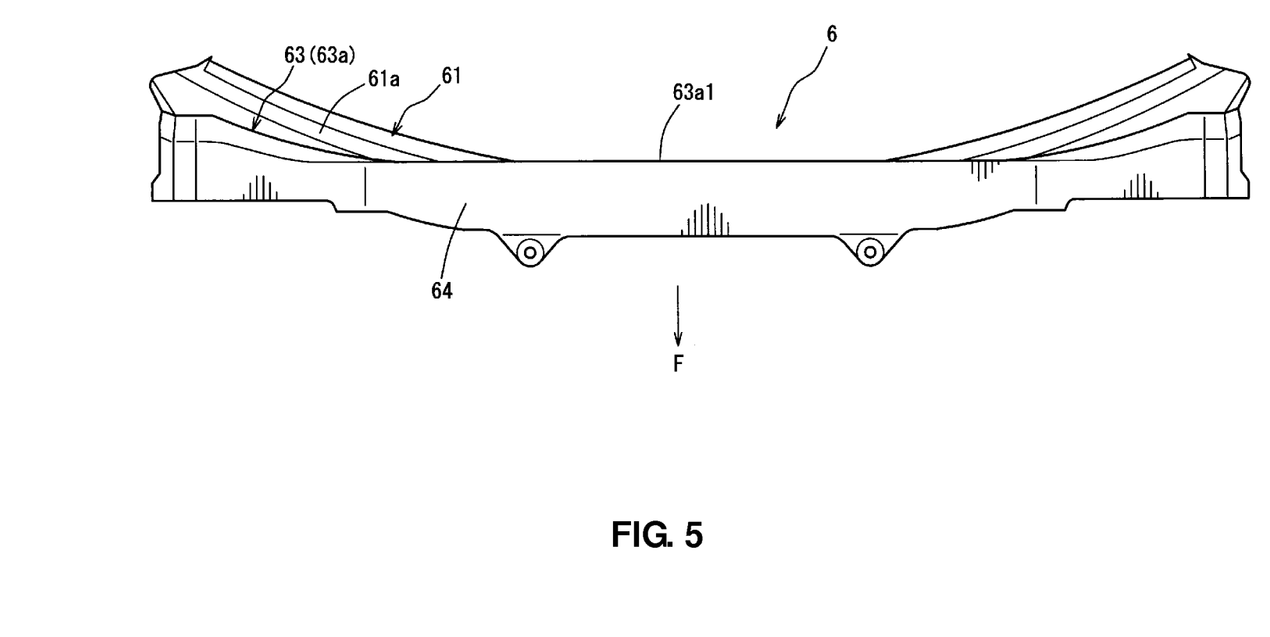
FIG. 5 is a bottom view of the cowl panel.
Figure 6:
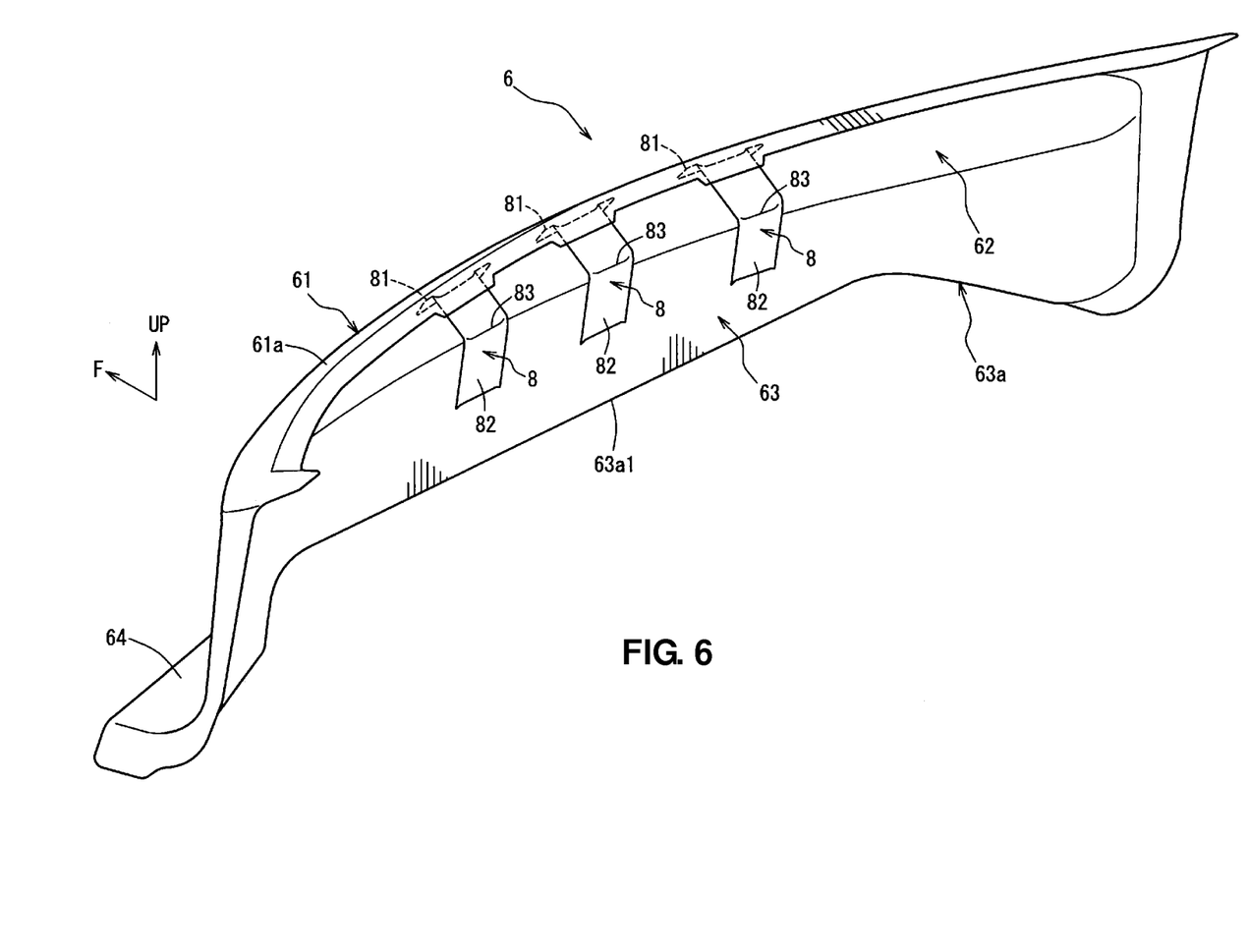
FIG. 6 is a perspective view of the cowl panel, when viewed from a vehicle rear-and-upper side.

Meanwhile, the vertical wall portion 63 has a lower end 63a which is configured such that at least a central portion 63a1, in the vehicle width direction, of the lower end 63a extends substantially straightly in the vehicle width direction in the plane view as shown in FIGS. 4-6.

An upper end of the dash panel 5 is joined to a lower side of the lower face portion 64 as shown in FIGS. 2 and 3. Thus, the cowl panel 6 is supported at the dash panel 5 from below. Further, a joint portion of the dash panel 5 and the lower face portion 64 is positioned in front of and apart from the above-described straightly-extending portion 63a1 of the vertical wall portion 63.

The lower face portion 64 is, as shown in FIGS. 2-6, configured to extend substantially horizontally, and an angle θ1 (see FIGS. 2 and 3) between the vertical wall portion 63 and the lower face portion 64 is set at 90 degrees.

As shown in FIGS. 2 and 3, the cowl front panel 7 is comprised of, in the above-described sectional view, a lower face portion 71, a vertical wall portion 72 extending upward from a front end of the lower face portion 71, and an upper face portion 73 extending vehicle forward from an upper end of the vertical wall portion 72.

A rear end of the lower face portion 71 of the cowl front panel 7 is joined to the front end of the cowl panel 6, and a cowl box which opens upward over the width direction is formed by the cowl panel 6 and the cowl front panel 7.

As shown in FIGS. 2, 3 and 6, each reinforcing member 8 includes a first joint portion 81 and a second joint portion 82 at its upper portion and lower portion. The joint portions 81, 82 are joined to a lower side of the upper face portion 61 and a rear side of the vertical wall portion 63, respectively. Thus, the reinforcing members 8 are joined to a vehicle-rearward side of the cowl panel 6.

The first joint portion 81 is, as shown in FIGS. 2 and 3, joined to the upper face portion 61 in the vicinity of the joint portion of the windshield 9. An angle θ2 (see FIGS. 2 and 3) between the windshield 9 and the upper portion of the reinforcing member 8 in the side view is set substantially at 90 degrees.

Further, the reinforcing members 8 are, as shown in FIGS. 2, 3 and 6, arranged at three points of the central portion and both sides, in the vehicle width direction, of the cowl panel 6 (the windshield 9) in a vehicle-width-direction range of the straightly-extending portion 63a1 of the vertical wall portion 63. This arrangement position of the reinforcing members 8 are set by considering the shape of vibration wave of the windshield 9 when the windshield 9 vibrates, specifically, set at the position of the antinode of the vibration.

According to the present embodiment, the cowl panel 6 (the upper face portion 61) supporting the windshield 9 is reinforced by the above-described reinforcing members 8.

Accordingly, the support rigidity of the windshield 9 is ensured, so that the function of restraining booming noise caused by vibrations of the windshield 9 can be ensured. Further, by arranging the reinforcing members 8, corresponding to the position of the antinode of the vibration of the windshield 9, the vibration of the windshield 9 can be more effectively restrained by the properly-small number of reinforcing members 8.

Each reinforcing member 8 includes a bending portion 83 between the first joint portion 81 and the second joint portion 82 as shown in FIGS. 2, 3 and 6.

The bending portion 83 of the reinforcing member 8 positioned at the central portion in the vehicle width direction is, as shown in FIG. 2, formed at a portion which is located below the level of a central portion $C_L$ of a vertical width L between the joint portion of the windshield 9 and the upper face portion 61 and an upper end of the second joint portion 82 in the above-described sectional view. Meanwhile, the bending portion 83 of the reinforcing members 8 positioned at the both sides in the vehicle width direction is formed at the central portion $C_L$ of the vertical width L as show in FIG. 3.

Figure 10A:
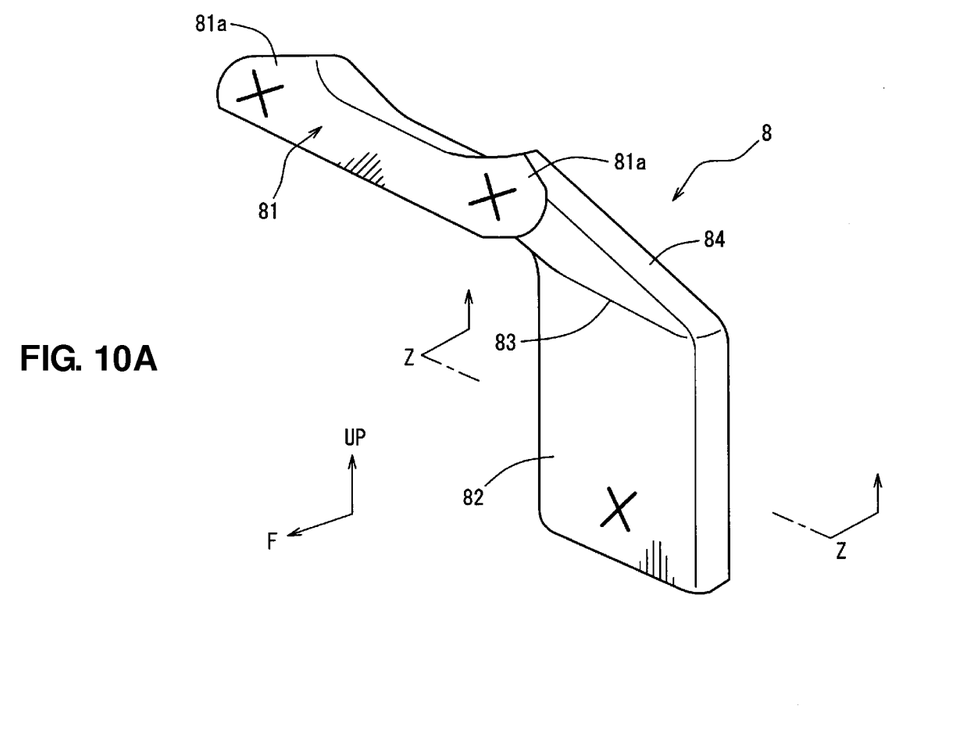
FIG. 10A is a perspective view of the reinforcing member.

Further, as shown in FIG. 10A, the first joint portion 81 of the reinforcing member 8 has a flange portion 81a which projects outward, in the vehicle width direction, from another part of the upper portion of the reinforcing member 8. In FIG. 10A, a joint point of the reinforcing member 8 (the first joint portion 81, the second joint portion 82) and the cowl panel 6 is illustrated by a mark X. The first joint portion 81 of the reinforcing member 8 is joined to the lower side of the upper face portion 61 of the cowl panel 6 via the flange portion 81a.

Figure 10B:
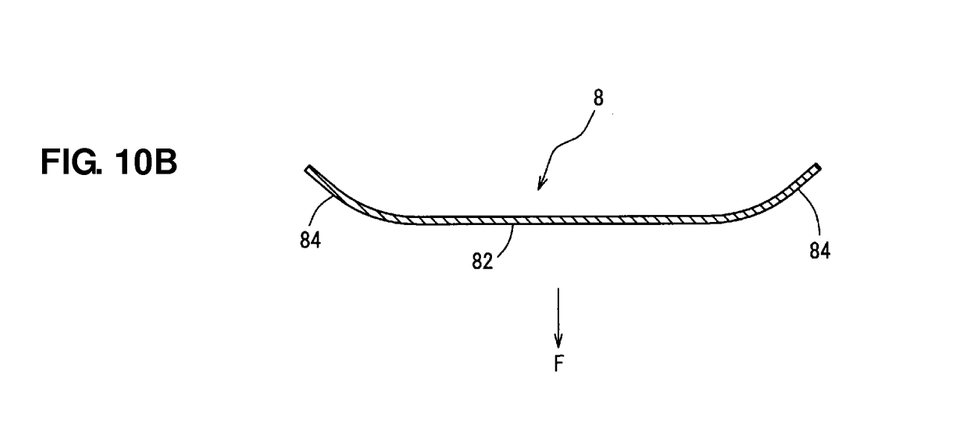
FIG. 10B is a sectional view taken along line Z-Z of FIG. 10A.

Also, the reinforcing member 8 has a pair of rising edge portions 84 at its both ends in the vehicle width direction as shown in FIGS. 10A, 10B. The rising edge portions 84 are configured to obliquely project vehicle rearward such that a distance, in the vehicle width direction, the pair of the rising edge portions 84 gradually increases toward vehicle rearward as shown in FIG. 10B.

Next, a case in which the collision load is inputted to the windshield 9 from above will be described referring to FIGS. 7 and 8. For example, as shown in FIGS. 7 and 8, in the case in which the collision load is inputted to the windshield 9 from above when an object α collides or the like, the protrusion portion 62 of the cowl panel 6 deforms in a folding state as shown in FIG. 7 first, so that the collision energy can be absorbed accordingly.

Figure 7:
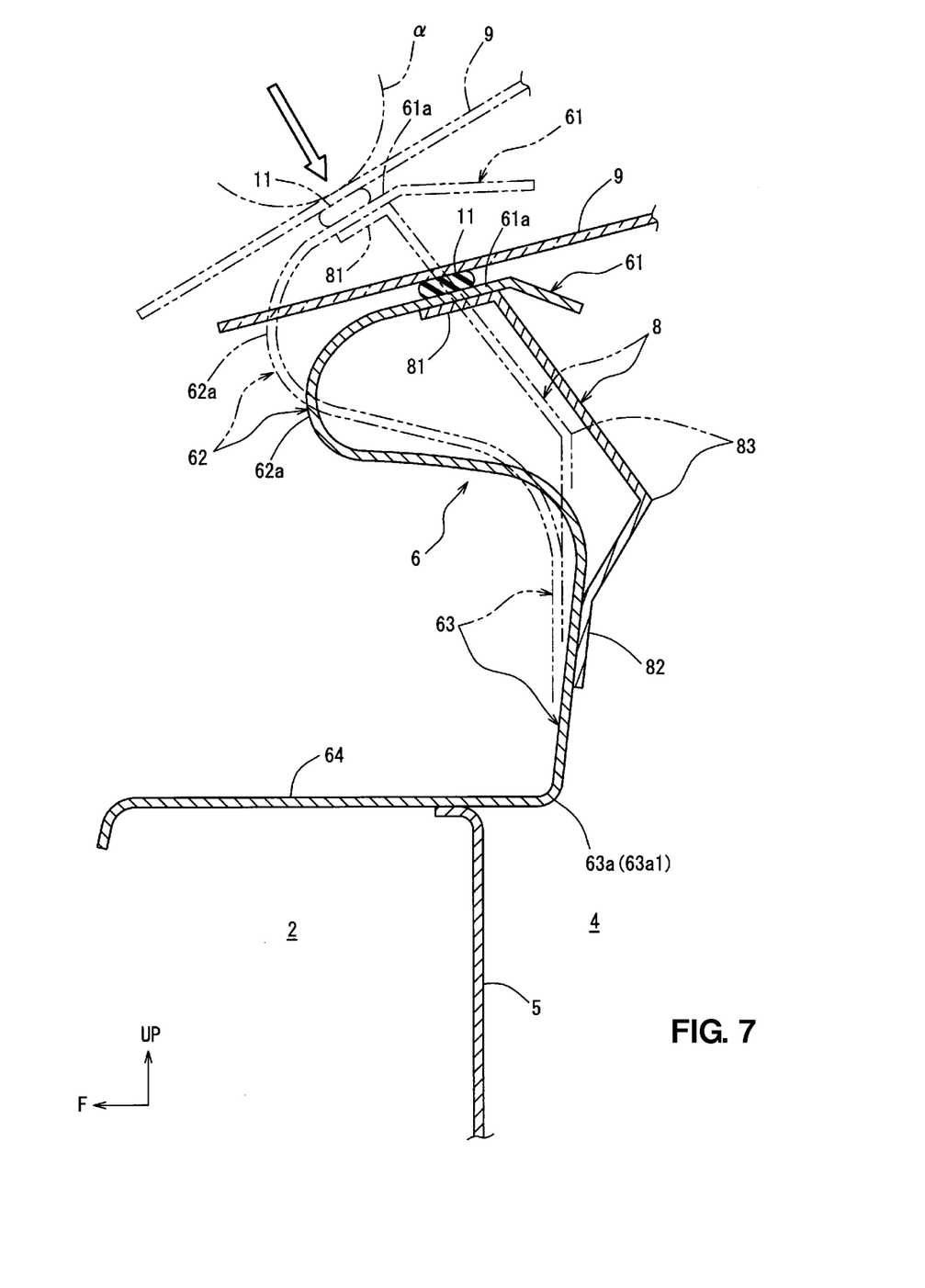
FIG. 7 is a sectional view showing a deformation state of the cowl panel and a reinforcing member.

Herein, in FIG. 7, the reinforcing members 8 deform in the folding state such that the bending portions 83 are displaced vehicle rearward, so that the smooth deformation of the protrusion portion 62 is may not be improperly influenced by this bending deformation of the reinforcing members 8.

Figure 8:
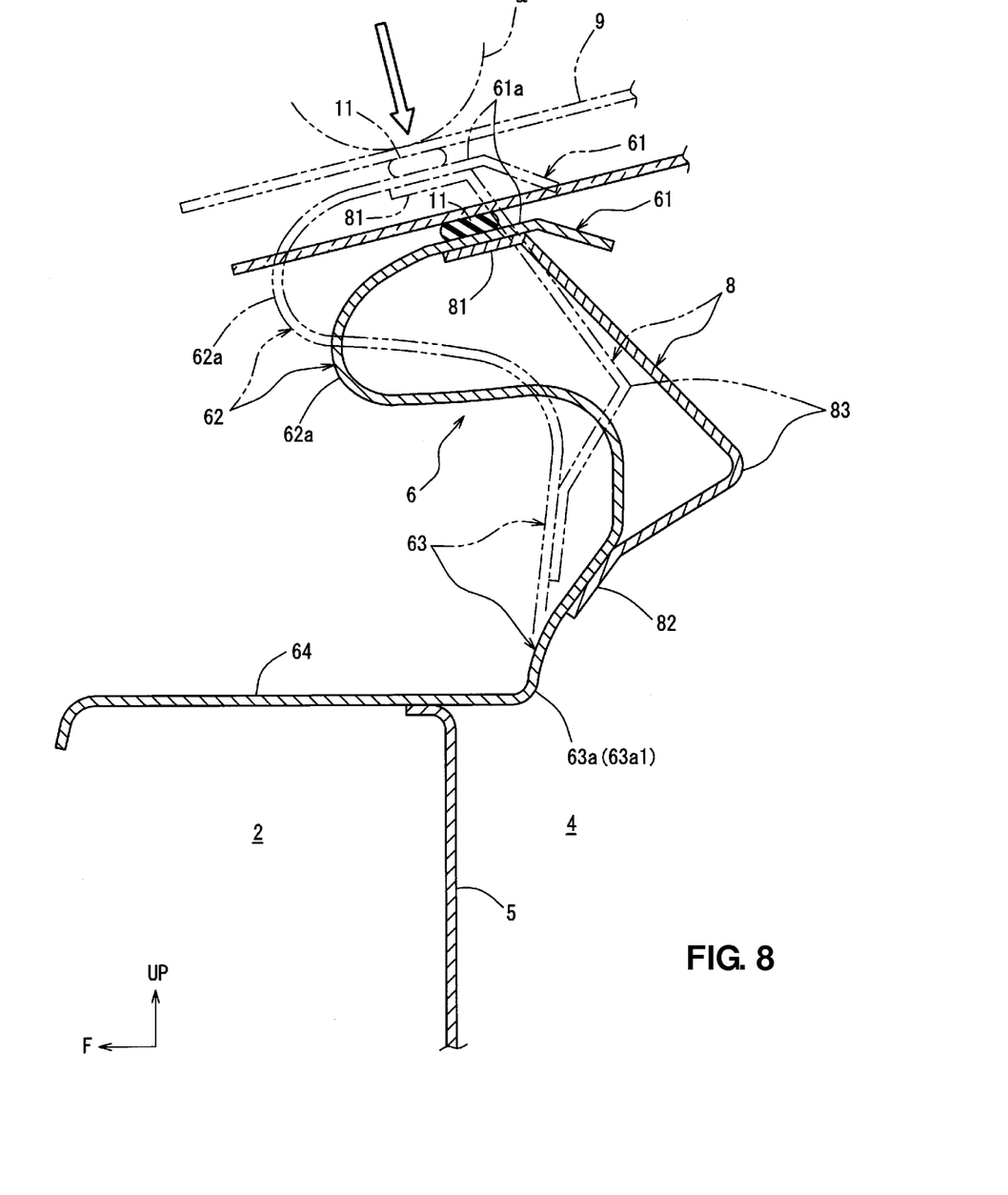
FIG. 8 is a sectional view showing another deformation state of the cowl panel and a reinforcing member.

Then, when the collision load is inputted further, the cowl panel 6 deforms such that the vertical wall portion 63 falls down as shown in FIG. 8, so that the collision energy can be absorbed further. In FIG. 8, the bending deformation of the reinforcing members 8 further progresses, so that the smooth deformation of the vertical wall portion 63 may not be improperly influenced by this progress of the bending deformation of the reinforcing members 8.

According to the present embodiment, the cowl panel 6 comprises the protrusion portion 62 which is configured to protrude vehicle forward beyond the joint portion of the windshield 9 and the upper face portion 61 so as to deform in the folding state when receiving the load inputted from above, the front end of the protrusion portion 62 is configured in the curve shape in the plan view such that its central portion is positioned forward the most, and the lower end of the vertical wall portion 63 is configured such that at least the central portion, in the vehicle width direction, of the lower end extends substantially straightly in the vehicle width direction. The front vehicle-body structure according to the present invention can ensure both the NVH performance and the pedestrian protection performance, improving the flexibility of interior design.

Specifically, a space behind the cowl panel 6, i.e., a space of a front portion of the vehicle compartment 4, can be properly enlarged by the protrusion portion 62 being configured to protrude vehicle forward beyond the joint portion of the windshield 9 and the upper face portion 61. Accordingly, the flexibility of interior design can be improved.

Further, since the front end of the protrusion portion 62 is configured in the curve shape in the plan view such that the central portion, in the vehicle width direction, thereof is positioned forward the most, the support rigidity of the windshield can be increased more than a case in which the front end of the protrusion portion is configured to extend substantially straightly in the vehicle width direction in the plan view. Accordingly, the NVH performance can be ensured properly.

Further, in the case in which the collision load is inputted from above when the object α collides with the windshield 9 or the like, the cowl panel 6 can be made to deform in upper-and-lower two stages such that the protrusion portion 62 folds up and the vertical wall portion 63 falls down vehicle rearward. Accordingly, the collision energy can be properly absorbed by an entire part of the cowl panel 6.

Herein, in a case in which the lower end 63a of the vertical wall portion 63 is configured in the curve shape such that the central portion, in the vehicle width direction, of the lower end 63a is positioned forward the most, corresponding to the shape of the front end 62a of the protrusion portion 62, there is a concern that it may be difficult to make the vertical wall portion 63 fall down smoothly. According to the present embodiment, however, since the lower end 63a of the vertical wall portion 63 is configured such that at least the central portion, in the vehicle width direction, of the lower end 63a extends substantially straightly in the vehicle width direction, the vertical wall portion 63 can be made to fall down smoothly. Accordingly, the collision-energy absorption by the entire part of the cowl panel 6 can be promoted, so that the pedestrian protection performance can be ensured properly.

Further, there is a concern that it may be difficult to form the lower end 63a through bending processing in the case in which the lower end 63a of the vertical wall portion 63 is configured in the curve shape such that the central portion, in the vehicle width direction, of the lower end 63a is positioned forward the most. However, since the lower end 63a of the vertical wall portion 63 is configured such that at least the central portion, in the vehicle width direction, of the lower end 63a extends substantially straightly in the vehicle width direction as described above according to the present embodiment, the bending processing of the lower end 63a can be facilitated, so that properly-easy processing of the lower end 63a can be ensured.

Herein, while the both-side end portions, in the vehicle width direction, of the lower end 63a of the vertical wall portion 63 are configured to extend not straightly in the present embodiment, as long as at least the central portion, in the vehicle width direction, of the lower end 63a extends substantially straightly as described above, the vertical wall portion 63 can be made to fall down smoothly and also the processing of the lower end 63a can be facilitated.

Further, since the joint portion of the dash panel 5 supporting the cowl panel 6 from below and the lower face portion 64 is positioned in front of and apart from the straightly-extending portion 63a1 of the lower end 63a of the vertical wall portion 63, it can be prevented that deforming of the lower end 63a of the vertical wall portion 63, i.e., falling down of the vertical wall 63, is blocked by the joint portion of the dash panel 5 and the lower face portion 64.

Also, since the lower face portion 64 is configured to extend substantially horizontally, and the angle θ1 between the lower face portion 64 and the vertical wall portion 63 is set at 90 degrees or larger, the vertical wall portion 63 can be made to fall down vehicle rearward more smoothly.

Further, in a case in which the lower face portion 64 is joined to the dash panel 5, if the above-described angle θ1 is set to be less than 90 degrees, the vertical wall portion 63 slants forward and upward. Consequently, there is a concern that a working space for conducting welding with a welding gun set at the position of the joint portion of the both may not be ensured sufficiently. By contrast, since the angle θ1 is set at 90 degrees or larger according to the present embodiment, the above-described working space can be ensured sufficiently. Accordingly, the welding process can be facilitated.

Figure 9A:
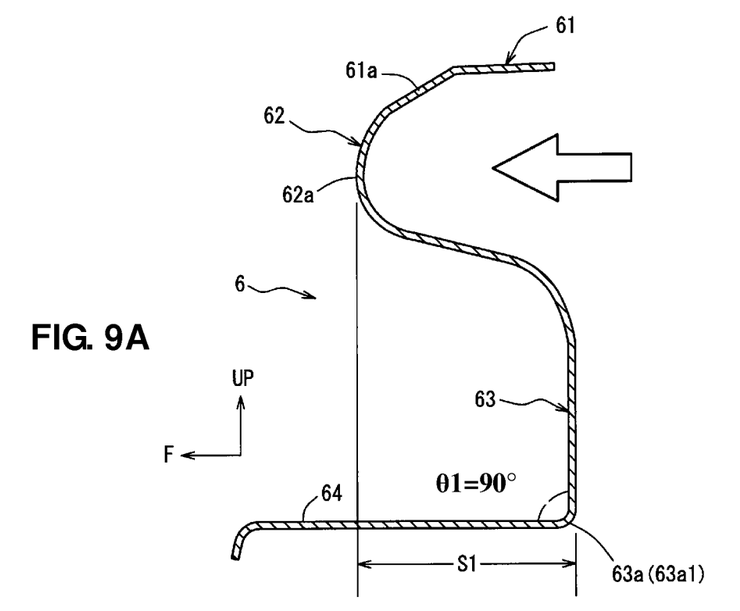
FIGS. 9A and 9B are explanatory views explaining a relationship of an angle between a lower face portion and a vertical wall portion and a depth (pressing amount) of a protrusion portion, FIG. 9A explaining a case in which the angle is set substantially at 90 degrees, FIG. 9B explaining another case in which the angle is set to be larger than 90 degrees.
Figure 9B:
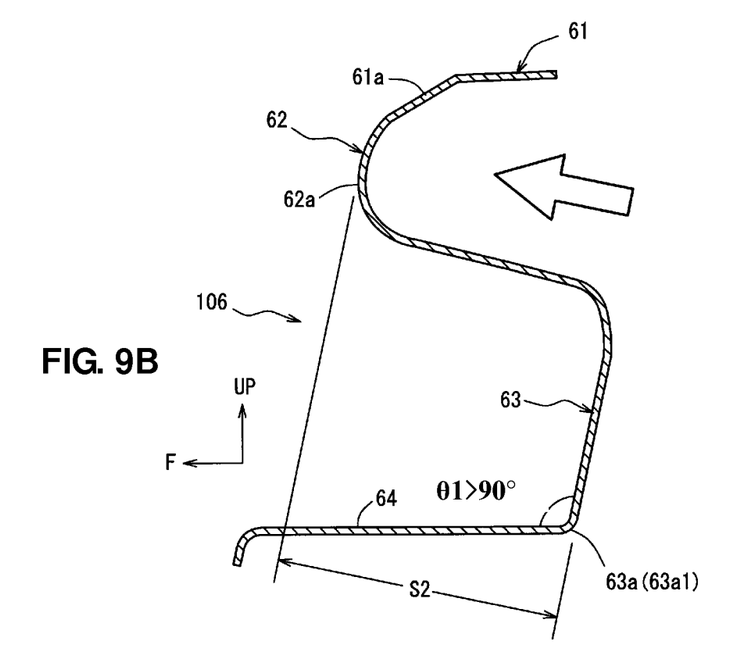

Moreover, by setting the above-described angle θ1 substantially at 90 degrees, in a case in which the position of the front end 62a is set at a specified position, the depth (pressing amount) S1 of the protrusion portion 62 (see the cowl panel 6 of FIG. 9A) can be made smaller than the depth (pressing amount) S2 of a case in which the above-described angle is set to be larger than 90 degrees (see a cowl panel 106 of FIG. 9B). Accordingly, an entire length of a plate member which is necessary for forming the cowl panel 6 can be properly short, so that manufacturing costs can be reduced.

Further, since the pressing amount at the time of forming the protrusion portion 62 has a certain limit, the forming (processing) of the cowl panel 6 can be facilitated by minimizing the depth (pressing amount) S1 of the protrusion portion with the setting of the angle of substantially 90 degrees as well.

Also, since the reinforcing members 8 are joined in the vehicle-width-direction range of the straightly-extending portion 63a1, the upper portions of the reinforcing members 8 being joined to the lower side of the upper face portion 61, the lower portions of the reinforcing members 8 being joined to the rear side of the vertical wall portion 63, the reinforcing members 8 can be made to directly contribute to the support rigidity of the windshield 9. Accordingly, the support rigidity of the windshield 9, thereby the NVH performance can be improved.

Further, since the reinforcing members 8 are joined in the vehicle-width-direction range of the straightly-extending portion 63a1 and also have the bending portions 83 projecting vehicle rearward, when the collision load is inputted to the windshield 9 from above, the reinforcing members 8 are made to deform in such a manner that the bending portions 83 are displaced vehicle rearward. Accordingly, the support rigidity of the windshield 9 can be improved more without improperly influencing the smooth deformation of the protrusion portion 62 and the vertical wall portion 63.

Additionally, the reinforcing member 8 has the first joint portion 81 joined to the lower side of the upper face portion 61 at the upper portion thereof and the second joint portion 82 joined to the rear side of the vertical wall portion 63 at the lower portion thereof, the bending portion 83 is provided between the first joint portion 81 and the second joint portion 82, the first joint portion 81 is joined to the upper face portion 61 in the vicinity of the joint portion of the windshield 9 and the upper face portion 61, and the bending portion 83 is formed at the portion which is located at or below the level of the central portion $C_L$ of the vertical width L between the joint portion of the windshield 9 and the upper face portion 61 and the upper end of the second joint portion 82. Thereby, since the bending portion 83 is formed at the level of the central portion $C_L$ or below the level of the central portion $C_L$, the portion from the lower end to the bending portion 83 which is supported at the vertical wall portion 63 by the joint to the second joint portion 82 can be made properly short. In this case, since the deforming of a portion positioned above the bending portion 83 and the vehicle-rearward displacement of the bending portion 83 is made smoother so that the reinforcing member 8 can be made to fold and deform (bend) greatly, the support rigidity of the windshield 9 can be improved without improperly influencing the smooth deformation of the protrusion portion 62 and the vertical wall portion 63. Thus, the pedestrian protection and the NVH performance can be ensured properly by the smooth deformation of the protrusion portion 62 and the vertical wall portion 63.

Further, by setting the angle θ2 between the windshield 9 and the upper portion of the reinforcing member 8 in the side view is set substantially at 90 degrees, the windshield 9 is supported substantially vertically, so that the support rigidity of the windshield 9, thereby the NVH performance can be improved further.

Moreover, since the reinforcing member 8 has a pair of rising edge portions 84 at its both ends in the vehicle width direction and the rising edge portions 84 are configured to obliquely project vehicle rearward such that the distance, in the vehicle width direction, of the pair of the rising edge portions 84 gradually increases toward vehicle rearward, the rigidity of the reinforcing member 8 against the vertical load can be increased. Accordingly, the support rigidity of the windshield, thereby the NVH performance can be improved further.

Also, since the first joint portion 81 has the flange portion 81a projecting outward, in the vehicle width direction, from another part of the upper portion of the reinforcing member 8 as shown in FIGS. 10A, 10B, the support rigidity of the windshield 9 can be improved further by increasing a contact area of the first joint portion 81 with the lower side of the lower face portion 61.

Further, since the flange portion 81a is joined to the lower side of the upper face portion 61, when welding process is conducted by using a welding gun which is set at a position of the joint portion of the first joint portion 81 and the lower side of the lower face portion 61, it can be prevented that the above-described other part of the upper portion of the reinforcing member 8 blocks the welding process, so that a large working space for conducting the welding can be ensured.

Herein, while the above-described embodiment shows the example of the three reinforcing members 8 being provided at the central portion and the both-side portions of the cowl panel 6, the arrangement position and the number of the reinforcing members 8 should not be limited to this example. For example, a single reinforcing member may be provided only at the central portion of the cowl panel 6, or two reinforcing members may be provided at the both-side portions of the cowl panel 6. Or, plural reinforcing members may be provided at regular intervals over substantially an entire width, in the vehicle width direction, of the cowl panel 6.

The central portion, in the vehicle width direction, of the lower end of the vertical wall portion extends substantially straightly in the vehicle width direction according to the present invention corresponds to the straightly-extending portion 63a1 of the above-described embodiment. Likewise, the vicinity of the joint portion of the windshield and the upper face portion corresponds to the vicinity of the adhesive agent 11.

The present invention should not be limited to the above-described embodiment, and any other modifications or improvements may be applied within the scope of a sprit of the present invention.

What is claimed is:

1. A front vehicle-body structure of a vehicle equipped with a cowl panel which extends continuously in a vehicle width direction and supports a windshield from below,
wherein said cowl panel comprises:
an upper face portion extending continuously in the vehicle width direction, to which the windshield is joined;
a protrusion portion extending continuously in the vehicle width direction, the protrusion portion being configured to extend downward from a front end portion of the upper face portion and protrude vehicle forward beyond a joint portion of the windshield and the upper face portion so as to deform in a folding state when receiving a load inputted from above, the protrusion portion having a front end which is configured in a curve shape in a plan view such that a central portion, in the vehicle width direction, of the front end is positioned forward the most;
a vertical wall portion extending continuously in the vehicle width direction, the vertical wall portion being configured to extend downward from the protrusion portion, the vertical wall portion having a lower end which is configured such that at least a central portion, in the vehicle width direction, of the lower end extends substantially straightly in the vehicle width direction; and
a lower face portion extending continuously in the vehicle width direction, the lower face portion being configured to extend vehicle forward from the lower end of the vertical wall portion.

2. The front vehicle-body structure of a vehicle of claim 1, further comprising a dash panel being configured to extend in the vehicle width direction and be joined to said lower face portion of the cowl panel for supporting the cowl panel from below, wherein a joint portion of said dash panel and the lower face portion of the cowl panel is positioned in front of and apart from said central portion extending substantially straightly in the vehicle width direction of the lower end of the vertical wall portion.

3. The front vehicle-body structure of a vehicle of claim 2, wherein said lower face portion of the cowl panel is configured to extend substantially horizontally, and an angle between the lower face portion and said vertical wall portion of the cowl panel is set at 90 degrees or larger.

4. The front vehicle-body structure of a vehicle of claim 3, wherein a reinforcing member is joined to a vehicle-rearward side of said cowl panel in a vehicle-width-direction range of said central portion extending substantially straightly in the vehicle width direction of the lower end of the vertical wall portion, an upper portion of the reinforcing member being joined to a lower side of said upper face portion of the cowl panel, a lower portion of the reinforcing member being joined to a rear side of said vertical wall portion of the cowl panel, the reinforcing member having a bending portion which is configured to project vehicle rearward.

5. The front vehicle-body structure of a vehicle of claim 1, wherein said lower face portion of the cowl panel is configured to extend substantially horizontally, and an angle between the lower face portion and said vertical wall portion of the cowl panel is set at 90 degrees or larger.

6. The front vehicle-body structure of a vehicle of claim 5, wherein said angle between the lower face portion and the vertical wall portion is set substantially at 90 degrees.

7. The front vehicle-body structure of a vehicle of claim 1, wherein a reinforcing member is joined to a vehicle-rearward side of said cowl panel in a vehicle-width-direction range of said central portion extending substantially straightly in the vehicle width direction of the lower end of the vertical wall portion, an upper portion of the reinforcing member being joined to a lower side of said upper face portion of the cowl panel, a lower portion of the reinforcing member being joined to a rear side of said vertical wall portion of the cowl panel, the reinforcing member having a bending portion which is configured to project vehicle rearward.

8. The front vehicle-body structure of a vehicle of claim 7, wherein said reinforcing member has a first joint portion joined to the lower side of the upper face portion of the cowl panel at the upper portion thereof and a second joint portion joined to the rear side of the vertical wall portion of the cowl panel at the lower portion thereof, and said bending portion of the reinforcing member is provided between said first joint portion and said second joint portion, the first joint portion being joined to the upper face portion in the vicinity of the joint portion of the windshield and the upper face portion, the bending portion being formed at a central portion, in a vertical direction, of the reinforcing member which is positioned between the joint portion of the windshield and the upper face portion and an upper end of the second joint portion, or at a portion which is located below the level of said central portion of the reinforcing member.

9. The front vehicle-body structure of a vehicle of claim 7, wherein an angle between said windshield and the upper portion of said reinforcing member in a side view is set substantially at 90 degrees.

10. The front vehicle-body structure of a vehicle of claim 7, wherein said reinforcing member has a pair of rising edge portions at both ends, in the vehicle width direction, thereof, the pair of rising edge portions being configured to obliquely project vehicle rearward such that a distance, in the vehicle width direction, therebetween gradually increase toward vehicle rearward.

11. The front vehicle-body structure of a vehicle of claim 7, wherein said first joint portion of the reinforcing member has a flange portion which projects outward, in the vehicle width direction, from another part of the upper portion of the reinforcing member, and the reinforcing member is joined to the lower side of the upper face portion via said flange portion.

12. The front vehicle-body structure of a vehicle of claim 7, wherein said reinforcing member is comprised of plural members which are provided separately from each other in the vehicle width direction.

13. A front vehicle-body structure of a vehicle, comprising:
a cowl panel extending continuously in a vehicle width direction and supporting a windshield from below; and
a reinforcing member joined to the cowl panel,
wherein said cowl panel comprises:
an upper face portion extending continuously in the vehicle width direction, to which the windshield is joined;
a protrusion portion extending continuously in the vehicle width direction, the protrusion portion being configured to extend downward from a front end portion of the upper face portion and protrude vehicle forward beyond a joint portion of the windshield and the upper face portion so as to deform in a folding state when receiving a load inputted from above, the protrusion portion having a front end which is configured in a curve shape in a plan view such that a central portion, in the vehicle width direction, of the front end is positioned forward the most;

a vertical wall portion extending continuously in the vehicle width direction, the vertical wall portion being configured to extend downward from the protrusion portion, the vertical wall portion having a lower end which is configured such that at least a central portion, in the vehicle width direction, of the lower end extends substantially straightly in the vehicle width direction; and a lower face portion extending continuously in the vehicle width direction, the lower face portion being configured to extend vehicle forward from the lower end of the vertical wall portion, and wherein said reinforcing member is joined to a vehicle-rearward side of said cowl panel in a vehicle-width-direction range of said central portion extending substantially straightly in the vehicle width direction of the lower end of the vertical wall portion, an upper portion of the reinforcing member being joined to a lower side of said upper face portion of the cowl panel, a lower portion of the reinforcing member being joined to a rear side of said vertical wall portion of the cowl panel, the reinforcing member having a bending portion which is configured to project vehicle rearward.

\* \* \* \* \*

UNITED STATES PATENT AND TRADEMARK OFFICE
CERTIFICATE OF CORRECTION

Page 1 of 1

PATENT NO.         : 9,096,272 B2
APPLICATION NO.    : 14/133273
DATED              : August 4, 2015
INVENTOR(S)        : Kouji Miyamoto et al.

It is certified that error appears in the above-identified patent and that said Letters Patent is hereby corrected as shown below:

Title page, (72) Inventors: 2nd inventor "Noriyoshi Sahasi, Hiroshima (JP)" should read --Noriyoshi Sahashi, Hiroshima (JP)--

Signed and Sealed this
Second Day of February, 2016

Michelle K. Lee
*Director of the United States Patent and Trademark Office*